(12) United States Patent
Hoppe et al.

(10) Patent No.: US 7,832,234 B2
(45) Date of Patent: Nov. 16, 2010

(54) HOT FORMED ARTICLES AND METHOD AND APPARATUS FOR HOT-FORMING

(75) Inventors: Bernd Hoppe, Ingelheim (DE); Andreas Hirsch, Ingelheim (DE); Ulrich Fotheringham, Wiesbaden (DE); Michael Weisser, Sturbidge (DE); Paulette Onorato, Sudbury, MA (US); Edward Skowron, Charlton, MA (US); Vijay Shanbhag, Southbridge, MA (US)

(73) Assignee: Schott AG, Mainz (DE)

( * ) Notice: Subject to any disclaimer, the term of this patent is extended or adjusted under 35 U.S.C. 154(b) by 856 days.

(21) Appl. No.: 10/858,461

(22) Filed: Jun. 1, 2004
(Under 37 CFR 1.47)

(65) Prior Publication Data
US 2005/0274149 A1    Dec. 15, 2005

(51) Int. Cl.
*C03B 32/00* (2006.01)
*C03B 32/02* (2006.01)
(52) U.S. Cl. .......................... 65/33.2; 65/435
(58) Field of Classification Search .............. 65/435
See application file for complete search history.

(56) References Cited

U.S. PATENT DOCUMENTS

| 3,620,706 A | 11/1971 | Spanoudis ............. 65/114 |
| 2003/0056546 A1* | 3/2003 | Claus et al. ............ 65/386 |
| 2003/0182966 A1* | 10/2003 | Fotheringham et al. ..... 65/33.2 |

FOREIGN PATENT DOCUMENTS

| DE | 4202944 | 8/1993 |
| EP | 1171392 | 1/2002 |
| FR | 2 267 987 | 11/1975 |
| FR | 2 606 866 | 5/1988 |
| WO | WO 02/00559 | 1/2002 |

OTHER PUBLICATIONS

European Search Report dated Sep. 12, 2005.
* cited by examiner

*Primary Examiner*—Jason L Lazorcik
*Assistant Examiner*—Russell J Kemmerle, III
(74) *Attorney, Agent, or Firm*—Ohlandt, Greeley, Ruggiero & Perle, LLP

(57) ABSTRACT

A method of hot forming of at least a part of an article is provided. The article includes a material selected from the group consisting of transparent and semitransparent materials. The method includes semi-homogeneously heating at least a part of the article by radiation and forming the heated part of the article.

43 Claims, 6 Drawing Sheets

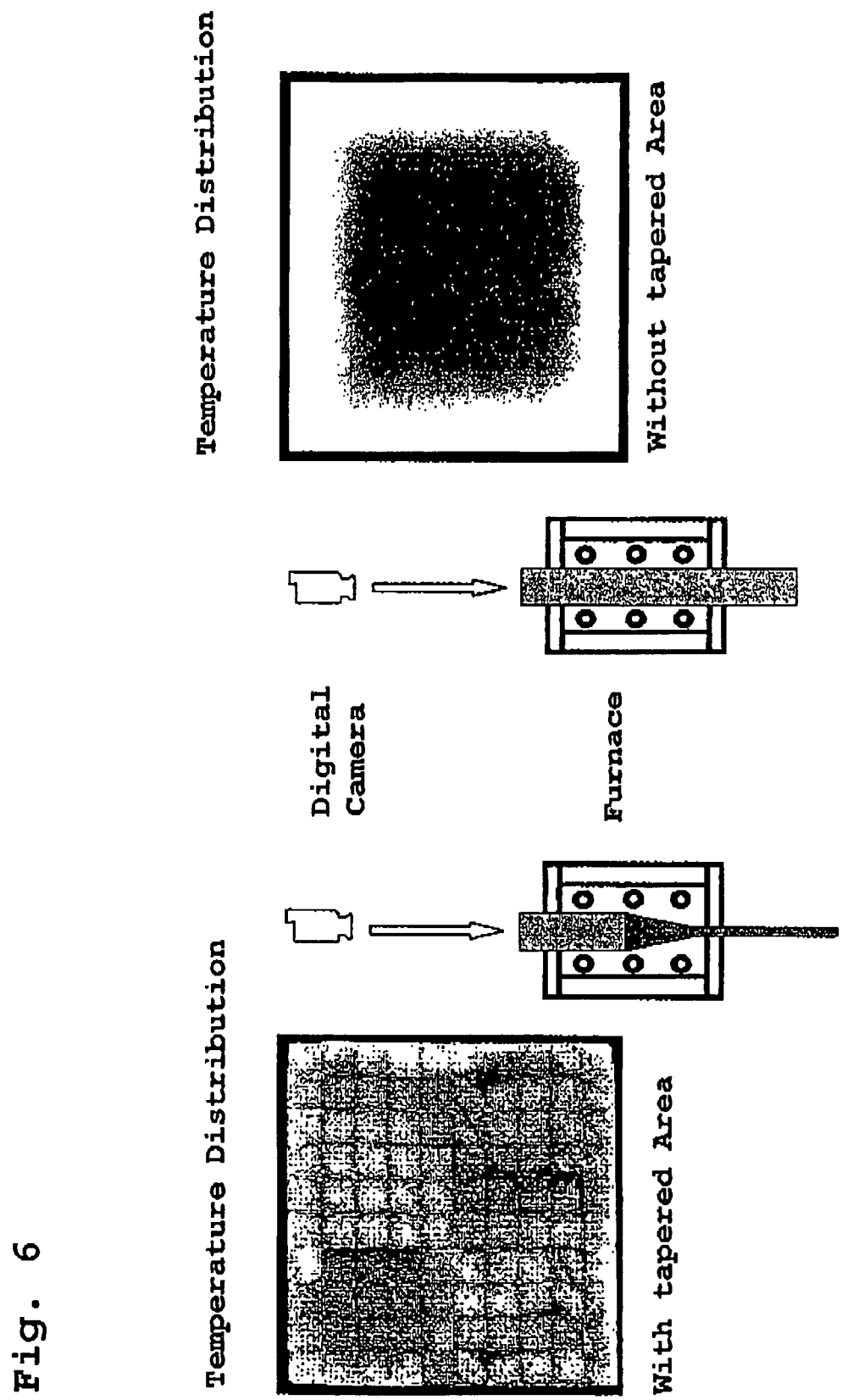

HOT FORMED ARTICLES AND METHOD AND APPARATUS FOR HOT-FORMING

BACKGROUND OF THE INVENTION

1. Field of the Invention

The invention relates in general to the field of hot forming articles and especially to a method of and an apparatus for hot forming of at least a part of an article, and to articles which at least in part are hot formed.

2. Description of Related Art

In the field of hot forming of articles exists a huge experience, especially in the field of drawing of fiber optic articles, as single fibers, hollow fibers, multi fiber rods or of optical face plates, inverters, and tapers.

Optical fibers or multi fiber rods may consist of glass or synthetic material as plastic, especially polymeric material, or any combination of these materials.

Further, hot ductile material as glass ceramic material is heated to initiate micro crystallization or ceramization processes.

In shaping processes, especially hot forming or hot post-processing, semi-transparent or transparent glasses and/or glass ceramic materials and plastics are heated up to a processing point where a viscosity $\eta$ between $10^{14.5}$ and $10^4$ dPas is encountered or beyond that. Semi-transparent or transparent glasses and/or glass ceramics, for the setting-in of certain material properties, for example ceramization, are heated mostly to temperatures which lie preferably above the lower cooling point at a viscosity $\eta$ of about $10^{14.5}$ dPas.

Typical, lower cooling points for glasses can be, depending on the type of glass, between 555 K and 1063 K, and typically the processing point can be up to 1978 K. For plastics the cooling and the processing point can be even much lower, typically being in the range of 250 K up to 580 K.

Hitherto according to the state of the art semi-transparent or transparent glasses and for glass ceramics, for example for ceramization, were heated preferably with surface heating by hot air and/or long-wave infrared is radiation. As surface heating there are designated processes in which at least 50% of the total heat output of the heat source is introduced into the surface or surface-near layers of the object to be heated.

Since most glasses in this wavelength range exhibit an absorption edge, 50% or more of the radiation output is absorbed by the surface or in surface-near layers.

As glass or glass ceramic material has as a rule a very low heat conductivity in the range 1 W/(mK), it was believed that glass or glass ceramic material with increasing thickness must be heated up more and more slowly in order to keep tensions in the glass or glass ceramics low. It was believed that when a homogeneous heating-up of the glass or of the glass ceramic is not achieved or is only inadequately successful, then this unfailingly would result in inhomogeneities in the process and/or in the product quality and/or in destroying the material.

From DE 42 02 944 C2 there has become known a process and a device comprising IR radiators for the rapid heating of materials which have a high absorption above 2500 nm. In order to rapidly introduce the heat given off from the IR radiators, into the material, DE 42 02 944 C2 proposes the use of a radiation converter from which secondary radiation is emitted with a wavelength range shifted into the long-wave direction with respect to the primary radiation.

A heating of transparent glass homogeneous in depth with use of short-wave IR radiators is described in U.S. Pat. No. 3,620,706. The process according to U.S. Pat. No. 3,620,706 is based on the principle that the absorption length of the radiation used in glass is very much greater than the dimensions of the glass object to be heated, so that the major part of the impinging radiation is transmitted through the glass and the absorbed energy per volume is nearly equal at every point of the glass body. What is disadvantageous in this process, however, is that no homogeneous irradiation over the surface of the glass objects is ensured, so that the intensity distribution of the IR radiation source is replicated on the glass to be heated. Moreover, in this process only a small part of the electric energy used is utilized for the heating of the glass.

In production processes of fiber optical image or light guides made of glass or plastic a preform which consists of multi-component transparent, semi-transparent and/or opaque glasses or plastics is heated by means of an electrical resistance heating and drawn to a fiber/multi fiber rod. If necessary, the developing fibers/fiber rods can be brought together again afterwards to build new preforms, which are again drawn to fibers/fiber rods. These new fibers/fiber rods thereby contain a multitude of the fibers/fiber rods drawn in the previous step. After several of such process steps one can get a fiber rod with several million single fibers, which can be used as image guides.

It proved to be difficult even for preforms with diameters greater than 50 mm to achieve a temperature distribution which is as homogenous as possible within the preform consisting of multi-component transparent, semi-transparent and/or opaque glasses or plastics, in a way that the drawing to a fiber/multi fiber rod does not lead to irregularities within the fibers/fiber rods. With plastics especially, the thermal damage at the surface has to be mentioned. Furthermore, the heating speed of the preform is crucial, since for drawing the fiber the preform can only be inputted and drawn as fast as mass is sufficiently heated.

A conventional resistance heating with temperatures of typically 1300 K at the heating coil is inadequate in this respect especially with preforms of diameters larger than 50 mm, since the emitted radiation is in a wavelength range absorbed on the surface or in layers near the surface of the glass or the plastic (penetration depth<1 mm), the heating thereby being a surface heating. The inner part of the preform has to be heated completely by thermal conduction. Since glass and plastic have a poor thermal conductivity, a lot of time is needed for the heating process especially of preforms with large dimensions, because it is necessary also for the inner part of the preform to reach the temperature needed for drawing and to reduce the average temperature within the preform. Also the subsequent drawing of the fiber or rod therefore can be done only with a limited speed, since new material of the preform has to be provided and heated continuously.

A possibility to avoid these difficulties should be, according to EP 1 171 392, to replace the heating elements usually used until now by appropriate short wave IR radiation sources arranged in a radiation cavity, the color temperature of which is above 1500 K and thus, a maximum radiation intensity at a wavelength shorter than 2000 nm. In this range, many glasses and plastics are almost transparent and absorb little of the incoming radiation. That way, a depth effective heating is achieved. Only negligible temperature inhomogenieties still arise, because every volume element absorbs the almost same amount of radiation. These amounts are each very small, since the absorption is very low.

By means of multiple reflections of the short-wave IR radiation at the walls of the radiation cavity the part of radiation reaching the material to be heated indirectly is above 50%. Furthermore, the associated rise in efficiency results in extremely high heating rates without damage to the material or disturbing temperature gradients.

However, in the production of image guides many, up to several million, single fibers/fiber rods are brought together to build a preform and often additionally single fibers of high-absorbing material are placed in between for contrast increase. The penetration depth from the side for short-wave IR radiation is drastically reduced by these high-absorbing fibers/fiber rods and by the Fresnel-reflection at the transparent fibers. That is because the radiation hitting from the side during the heating has to cross each single fiber/multi fiber rod, thereby passing two surfaces. Since there is a change in the refractive index at each surface crossing from glass or plastic to air or vice versa, according to Fresnel about 4% of the incoming radiation is reflected at each surface, which amounts to a total of 8% of the radiation per single fiber.

The reflected radiation hits surfaces of fibers crossed on the way to the inner region of the fiber again on the way back towards the periphery and is thereby again partly reflected, so that the effective penetration depth of the radiation into the inner region of the preform is up to 30 mm depending on the design. That means that in contradiction to the teachings of EP 1 171 392 neither is the preform completely penetrated by all of the IR radiation, so that an important amount of the radiation is reflected at the opposite wall of the radiation cavity, nor is only a small amount of the incoming radiation absorbed by the preform. Rather, an important amount of the total radiation is absorbed by the preform through multiple reflections and absorptions within the preform. A homogenous heating according to EP 1 171 392 especially of large preforms therefore is not possible.

It is an object of the invention, to improve the performance of hot forming processes.

BRIEF SUMMARY OF THE INVENTION

The invention depicts a method of hot forming of at least a part of an article, wherein said article comprises a material selected from the group consisting of transparent and semitransparent materials, wherein said at least a part of said article is heated by means of radiation and said heated part of said article is formed and whereby said heating is a semi-homogeneous heating.

The invention further teaches an apparatus for forming at least a part of an article comprising a holding means for holding said article a heater means for heating said at least a part of the article a forming means for forming of at least said part of the article, whereby said means for heating comprises a radiation source for heating said at least part of the article, and whereby said forming means is a drawing means.

The invention also covers articles formed according to an embodiment of the inventive method.

Preferably said semi-homogeneous heating causes a decrease of the draw temperature being both lower at a central portion of said article and at the surface of said article compared to conventional heating methods as for instance surface heating methods as discussed before.

According to the invention, semi-homogeneous heating is defined as heating at least one part or section of the article homogeneously or substantially homogeneously and at least one other part or section inhomogeneously with respect to the primary radiation source. Homogeneous heating may be, e.g., achieved by irradiating the part or section with radiation having a considerably larger penetration depth than the measure of the section in the direction of the incident radiation.

Inhomogeneous heating may result from a penetration depth of the heating radiation which is lower than the dimensions of the section to be heated.

Although inhomogeneous heating of a section of the article is applied, the temperature distribution according to semi-inhomogeneous heating is at least partly homogenized due to light guiding from a homogeneously heated region with nearly uniform radiation distribution inside the section to the inhomogeneously heated section.

Further, a transparent material is defined herein as a material which transmits more than 50% of the impinging radiation. A semi-transparent material is defined as a material which transmits more than 0% but less than 50% of the impinging radiation and an opaque material as a material that transmits 0% of the radiation.

Of course, the features of transparency, semi-transparency and opacity depend on the spectral distribution of the impinging radiation so that these features are always defined with respect to the spectrum of the radiation.

Although a more homogeneous distribution of the heating radiation is achieved by means of the invention, the temperature distribution may not be entirely uniform. Thus, according to one embodiment of the invention, the semi-inhomogeneous heating causes an increase of temperature of the heated article being lower at a more central portion and higher at a more peripheral portion of the article.

According to a development of this embodiment the more central portion is closer to the middle than the more peripheral portion. In example, the central portion may, e.g., be located in the middle and the peripheral portion at the periphery of the article.

In a preferred embodiment of the invention the material of at least said part of the article consists of glass.

In a further preferred embodiment of the invention, the material comprises an organic material selected from the group consisting of plastic, synthetic, and polymeric material.

In a still further preferred embodiment of the invention the material comprises glass and a material selected from the group consisting of plastic, synthetic, and polymeric material.

In a most preferred embodiment a radiation source is emitting electromagnetic radiation whereby more than 50% of the emitted radiation is in a wavelength range of 200 to 2700 nm and is a radiator having a temperature of more than 1500 K, especially having a temperature of about 3000 K.

A most preferred forming process according to the invention is a draw process.

The invention addresses a down-draw process and alternatively may be applied to an up-draw process.

Conventional heating methods used to draw articles comprising glass usually encounter the problem that peripheral portions of the article are heated up to considerably higher temperatures compared to more central portions. However, in order to draw the article, the more central portions need to be heated beyond the drawing temperature. In this case the higher temperature of the more peripheral portions may exceed a level at which undesirable changes of the material occurs. For example, the crystallization temperature may be exceeded. By employing semi-inhomogeneous heating according to the invention, however, the temperature difference between central and peripheral portions can be kept lower compared to conventional heating.

Accordingly, the invention provides a method of forming of at least a part of an article, preferably by employing a draw process, whereby the heated part of the article comprises glass and has a diameter of at least 50 mm, and whereby a temperature difference of 100 K at the most exists between a more central portion of the article and a more peripheral portion when the at least part of the article is heated.

According to another aspect of the invention, there is provided a method of forming of at least a part of an article, preferably by employing a draw process, whereby the heated part of the article comprises glass and has a diameter of at least 50 mm, and whereby even a temperature difference of only 40 K at the most exists between a more central portion of the article and a more peripheral portion when the at least part of the article is heated. Thus, with respect to articles comprising glass, semi-inhomogeneous heating may also be defined as heating of an article comprising glass and having a diameter of at least 50 mm, whereby a temperature difference of 100 K, or even of only 40 K at the most exists between a more central portion of the article and a more peripheral portion.

Generally, the temperature gradient within the heated material can be kept considerably lower compared to conventional heating methods. In particular, it has been established that by using semi-homogeneous heating the temperature gradient between a peripheral and a central portion of a heated part of the article comprising glass and having a diameter of more than 100 mm may lie below 1 Kelvin per millimeter, whereby the central portion has a temperature of more than 580 K.

Coming along with the low temperature differences inside of a heated article by utilizing inventive semi-inhomogeneous heating, a material can be drawn with reduced maximum temperature at peripheral portions, thereby avoiding undesirable effects such as liquefying and dropping-off of peripheral portions of the heated part.

The method is applicable within a large temperature range depending on the drawing material chosen. Thus, an article may be formed according to the invention with the more peripheral portion having a temperature of between 290 K and 2000 K.

In example, a material comprising a typical optical glass may be formed whereby a more peripheral portion of the article has a temperature of between 835 K and 915 K when the article is formed.

Another advantage of the invention is the comparably short heat-up time coming along with semi-inhomogeneous heating. Specifically, an article as defined above, comprising a more central portion and a more peripheral portion may be heated according to the invention so that the more peripheral portion of the heated part is heated in a period of time of less than six hours from a temperature of lower than 300 K to a temperature of higher than 890 K. Depending on the material to be heated and the dimensions of the preform, the more peripheral portion of the heated part may be heated from a temperature of lower than 300 K to a temperature of higher than 890 K in a shorter period of time, without generating tension cracks in the material. Specifically, the period may be less than 3 hours or even less than 1 hour.

Furthermore, it has been established that the inventive mechanism of semi-homogeneous heating works for many different cross-sectional shapes of a preform, such as for preforms having circular, elliptic, octagonal, hexagonal or quadratic cross-section.

Surprisingly, a rate of drawing may exceed a velocity of 10 mm per minute of the drawn part of the article relative to a clamped part of the article, the article being a multi fiber preform having a diameter of 115 mm and the drawn part having a diameter of about 25 mm or more. Generally, the processing of large preforms, which becomes possible using the invention also allows to fabricate multi fiber rods with larger diameters. Specifically, multi-fiber rods having diameters of greater than 25 mm, greater than 50 mm, or even greater than 79 mm may be drawn in a single drawing step.

Surprisingly also a multi fiber bundle having a diameter of more than 115 mm, of more than 125 mm and of more than 150 mm could be drawn to a diameter of up to 76 mm having optical grade quality.

The inventive method as well applies to forming a multi fiber rod out of a preform with a diameter greater than 25 mm, or greater than 50 mm or even greater than 75 mm with considerable drawing speed, whereby the preform may have large diameters of more than 100 mm, of more than 125 mm or even more than 150 mm.

According to still another aspect of the invention, an improved method of processing a multi fiber preform is provided, comprising the steps:

i) a multi fiber preform obtained by arranging a plurality of mono fibers is heated semi-homogeneously, ii) the semi-homogeneously heated multi fiber preform is drawn, iii) the drawn multi fiber preform is separated at predetermined length intervals, and iv) a plurality of drawn multi fiber preforms being separated at the predetermined length intervals is arranged in parallel forming a multi fiber bundle having an increased number of fibers, whereby the multi fiber bundle having an increased number of fibers is processed according to process steps i), ii) and iii).

Due to the very efficient semi-homogeneous heating, the improved method enables considerably higher drawing speeds. Thus, the inventive method enables fast fabrication of multi fiber rods with a very large number of fibers.

During the drawing step, the plurality of drawn multi fiber rods may additionally be twisted. Alternatively, the plurality of drawn multi fiber rods may be twisted after the drawing step.

Preferred articles formed at least in part by a process according to the invention comprise a fiber or a multi fiber rod. As well, an article may be formed from a preform comprising a cladding tube surrounding at least in part a core of a multi fiber preform.

Further preferred embodiments of the invention comprise an optical face plate, an optical inverter, an optical twister, a taper, a hollow fiber or a photonic crystal fiber, or a combination of these components.

The invention is described in more detail below in the light of preferred and most preferred embodiments thereof.

BRIEF DESCRIPTION OF THE SEVERAL VIEWS OF THE DRAWINGS

Reference is made in the detailed description of the preferred embodiments of the invention to the appended drawings in which

FIG. 6 shows temperature distributions along a cross sectional view extending perpendicular to the longest dimension of a square shaped multi fiber bundle preform before drawing and in the course of drawing the multi fiber bundle preform;

DETAILED DESCRIPTION OF THE INVENTION

Surprisingly, the invention succeeded in heating preforms of so far unknown diameters of more than 100 mm by means of a radiation unit utilizing short-wave radiation sources and walls, which have very good back scattering or reflecting properties, in a fast and semi-homogenous way and in drawing these afterwards with speeds of more than 10 mm/min and with a diameter of the drawn multi fiber rod of 25 mm whereby the preform features 115 mm in diameter.

The effect results from the instantaneous absorption of the radiation hitting the preform in a way that only a part of less than 50% of this radiation crosses the part of the preform, which is not tapered and may hit the preform again indirectly after reflection at the opposite wall of the radiation unit. The walls of the radiation unit are important for the homogenization of the radiation emitted by the radiation sources and reflected or scattered by the walls and for increasing the efficiency.

Furthermore, a part of the radiation emitted from the radiation sources, which hits the fibers under an angle below a certain value, is coupled into the single fibers/fiber rods and is axially transported, that way also contributing to the heating of the whole preform. This effect is especially noteworthy after starting the actual drawing of the fiber, since the radiation can penetrate up or down to the center of the preform in the part, which is tapered to a fiber/multi fiber rod, and the part of the radiation there being coupled into the fibers/fiber rods is axially transported also to the part of the preform, which is not tapered. Thereby, the inner fibers/fiber rods of this part of the preform, which are not directly reached from outside because of the limited penetration depth of the radiation, are indirectly heated.

Furthermore, as mentioned above, the tapered part of the preform can be penetrated by the radiation almost completely leading to an almost homogeneous temperature distribution and homogeneous heating. Therefore, beginning from this area less tapered parts of the preform which may be heated inhomogeneously by the primary radiation sources can be heated homogeneously or nearly homogeneously by conducting the heat and/or guiding the radiation, too.

Solid state emitters such as halogen tungsten emitters, but also gas discharge or electric-arc emitters can be utilized as radiation sources, wherein more than 50% of the complete radiation power of each emitter shall be within the wavelength range between 200 nm and 2700 nm.

The possibility to combine several process steps is one of the advantages of using large preforms besides economical aspects. Furthermore, the size of radiation units according to the invention can be minimized compared to conventional furnaces, which leads to reduced losses of the preform when starting up and shutting down the facility.

Figure 1:
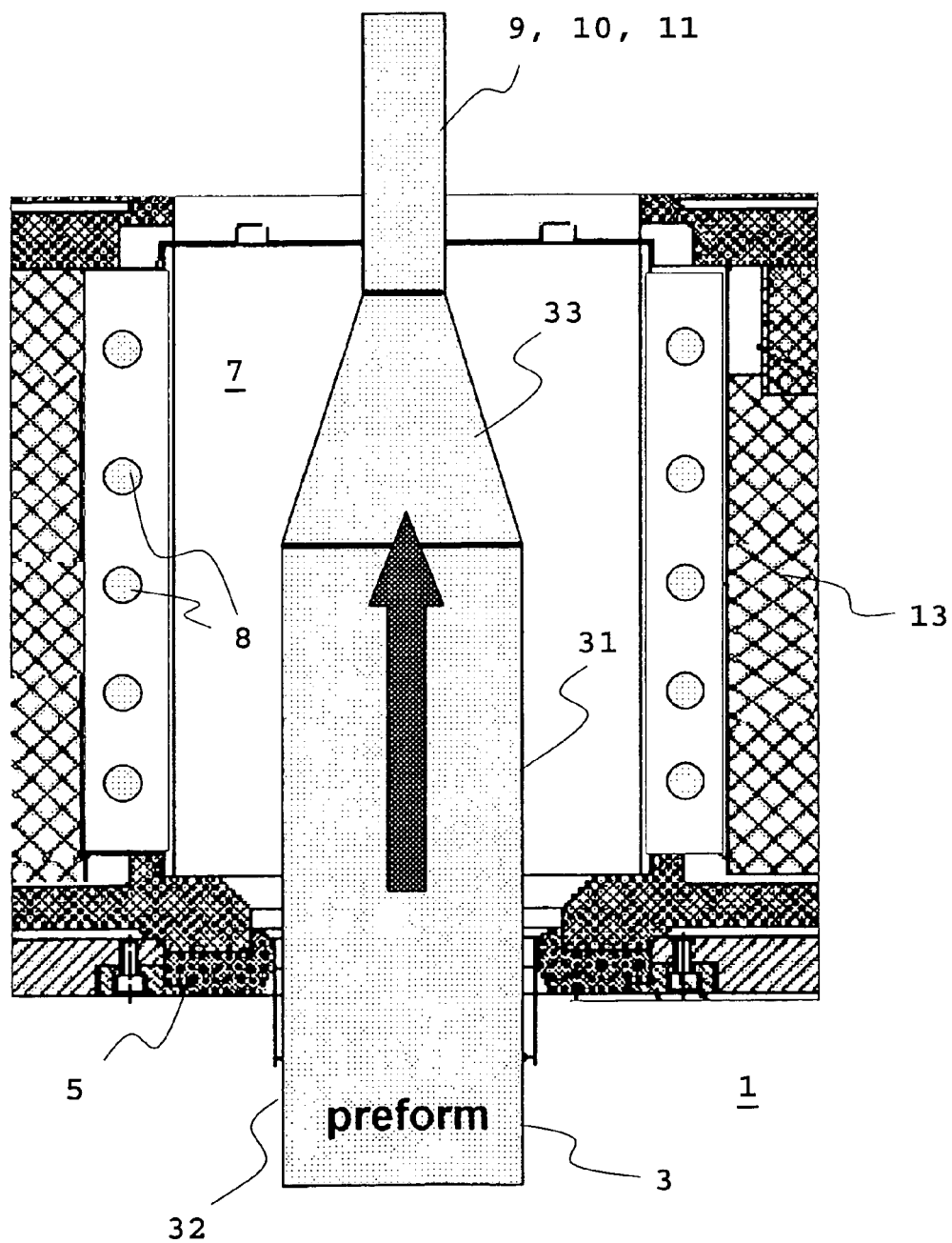
FIG. 1 shows a cross sectional view in a vertical plane extending across the center of a heating unit for semi-homogeneously heating at least a part of a multi fiber preform.

Subsequently, the invention is described with regard to the figures and by means of the preferred embodiments:

With the facility 1 shown schematically in FIG. 1 various fiber drawing experiments have been performed. In the experiments glass and plastic preforms have been used. Generally, all drawable transparent or semitransparent glasses or partly opaque glasses or combinations of these or plastics can be utilized. As well, preforms comprising glass ceramics can be drawn by employing the inventive method of semi-homogeneous radiation heating.

The diameter of the preforms was between 5 mm and 115 mm, wherein these are only exemplary values with no limiting meaning in upward or downward direction.

The preforms can either comprise only one glass or plastic in any conceivable geometry, like for instance round, square, triangular or polygonal rods and/or tubes or the like, or they can comprise several glasses or plastics, like for instance tubes of glass type 1/plastic type 1, in and/or around which rods of glass type 2/plastic type 2 are positioned. The preforms can also consist of several different single fibers/multi fiber rods put together, which can also be positioned inside a round or polyhedral tube.

The prototype facility can continuously produce fiber rods or fibers depending on the length and the diameter of the preform. This is carried out according to the following principle:

1. Pre-Heating

The pre-heating process has to be carried out once each time the facility is started up to prevent breaking of the preform 3 due to thermal tensions between the part 31 inside and the part 32 outside of the furnace 5. For this purpose the preform is transported into the radiation unit 7. The preform 3 is heated by means of a ramp temperature or power controlled. This only concerns that part of the preform 3 within the radiation unit, the part outside is not heated and has a temperature at the clamping point, which is slightly above room temperature depending if this part of the preform is insulated or not.

2. Fiber Drawing

Following the pre-heating, the actual fiber drawing starts: For this purpose, the preform 3 is further heated. When the end of the preform 3 reaches a certain temperature, it is tapered due to gravity or by exerting a force with an appropriate tool and the end of the fiber cane 9, fiber 10 or multi fiber rod 11 moves downward or upward, respectively, relative to the bulk of the preform 3.

By means of a device attached below the radiation unit, e.g. a belt or clamping mechanism, the fiber cane 9, fiber 10 or multi fiber rod 11 has to be moved away or rolled up from the tapered section 33, so that a constant diameter of the fiber 10 or fiber cane 9 or multi fiber rod 11 is achieved. Certainly, this facility can also be turned around by 180°, so that the fiber 10 or fiber cane 9 or multi fiber rod 11 is upwardly moved away.

The crucial part of the facility is a radiation unit 7 with one or more heating zones built from a material, preferably quarzal, which is highly reflecting in the wavelength range of the radiation sources. For radiation source any type of short-wave radiators 8, for instance halogen tungsten emitters or gas discharge lamps, can be utilized. The radiators 8 may advantageously be horizontally arranged essentially omega shaped radiation elements. Alternatively or additionally, vertically arranged straight radiators and/or round discharge bulbs may be provided as radiators 8. Generally, the shape and arrangement of the radiators 8 may be adapted to the dimensions an shape of the radiation unit 7 and the preform 3 in order to obtain a homogeneous distribution of the radiation power. Separation discs (not shown in FIG. 1) having a centric bore through which the preform 3 is guided can be inserted into radiation units with multiple heating zones in order to prevent crosstalk between the zones.

The radiation unit 7 is provided with an reflecting insulation 13 to the outside to reduce energy loss and temperature inhomogeneities. The insulation 13 may advantageously comprise quarzal, which is both highly reflecting and heat insulating.

The facility 1 described above enables a semi-continuously draw of fiber canes 9 or fibers 10 or multi fiber rods 11 as desired from the preform 3. With such a facility preforms 3 with a diameter of 115 mm have already been successfully drawn to multi fiber rods with a diameter of 25 to 76 mm.

Figure 2:
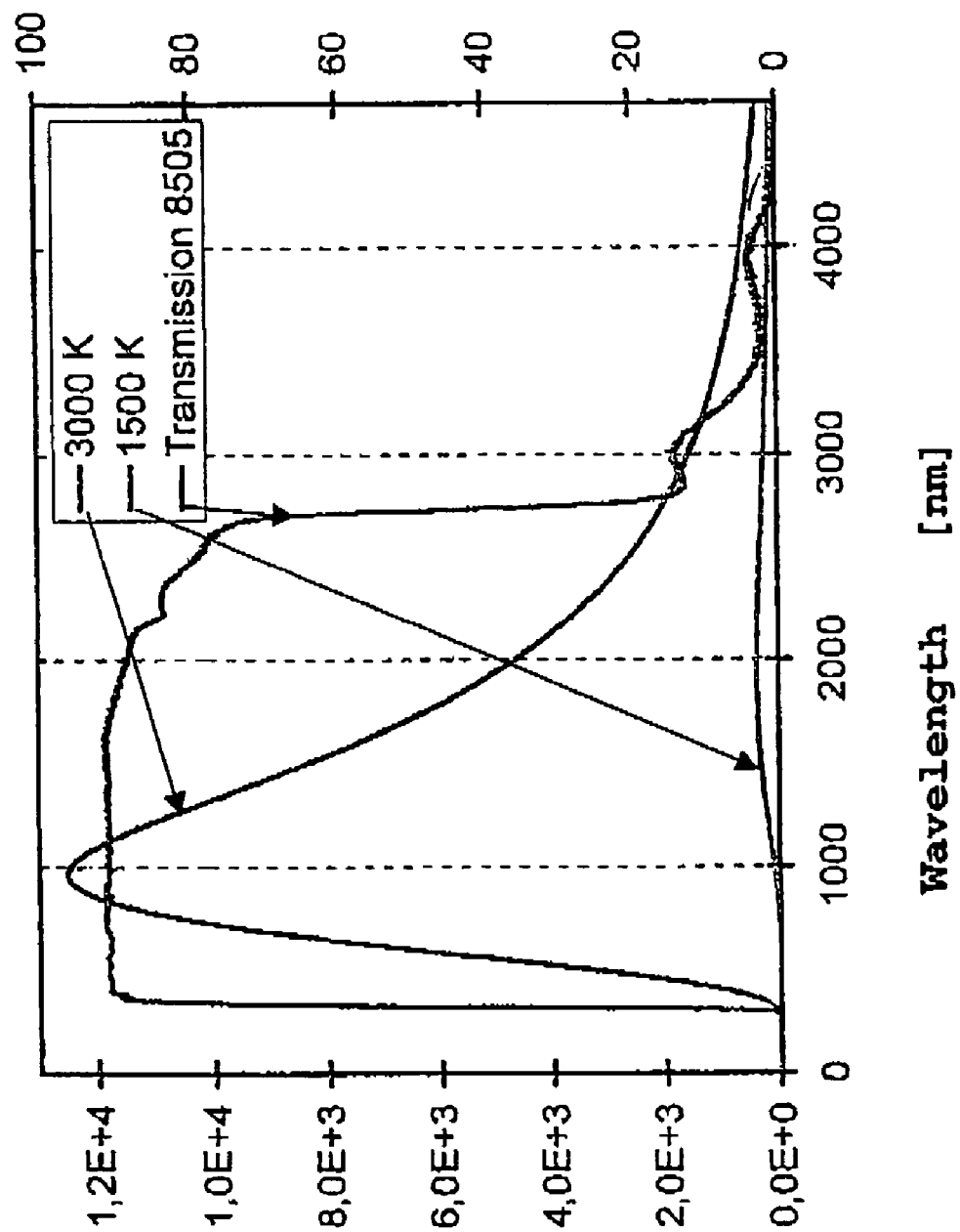
FIG. 2 shows emission spectra of a radiator emitting at a temperature of 1500 K and of a radiator emitting at a temperature of 3000 K and absorption characteristics of Schott Glass' 8505 Glass.

FIG. 2 shows emission spectra of a radiator emitting at a temperature of 1500 K and of a radiator emitting at a temperature of 3000 K and absorption characteristics of Schott Glass' 8505 Glass. As can be seen from the emission spectra, a radiator emitting at a temperature of 3000 K emits radiation in a wavelength range of above 200 nm with maximum power at about 960 nm, whereas a conventional heater operated at 1500 K emits at considerably longer wavelengths above approximately 900 nm with maximum power at about 2000 nm. Considering the transmission characteristics of a typical glass like Schott Glass' 8505 Glass, a radiator emitting at a temperature of 3000 K is more favourable, as it emits more than 50% of its power within the transparency window of the glass in the wavelength range of 200 nm to 2700 nm. Thus, by employing a radiator emitting at a temperature of 3000 K a large penetration depth of the radiation can be achieved.

Figure 3:
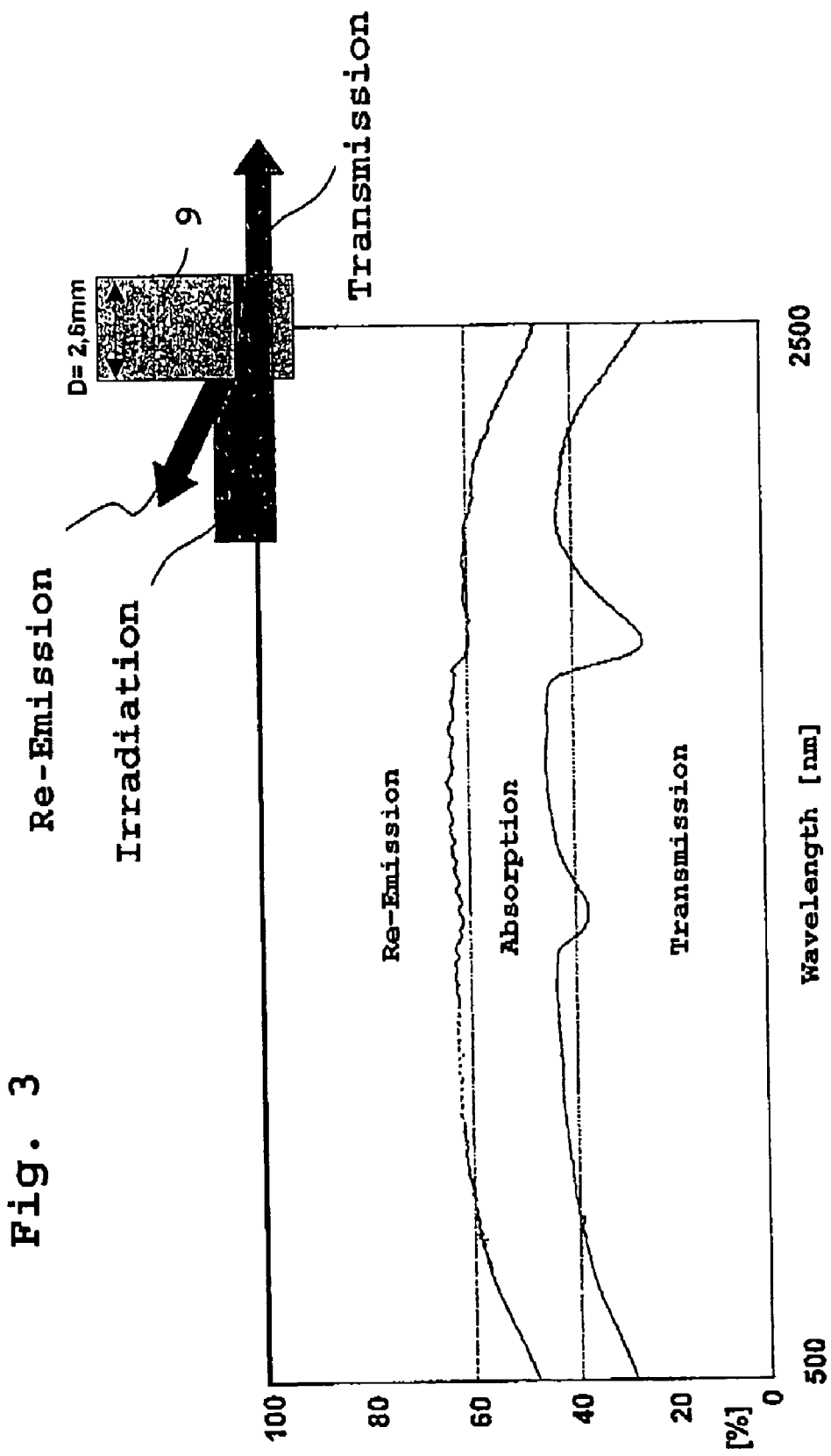
FIG. 3 shows wavelength dependent re-emission, absorption and transmission characteristics of electromagnetic radiation directed to a multi fiber bundle having a thickness of about 2.6 mm.

FIG. 3 shows wavelength dependent re-emission, absorption and transmission characteristics of electromagnetic radiation directed to a multi fiber rod 11 drawn out from the tapered section 33 of a preform 3 as shown in FIG. 1. The fiber rod 11 of this example has a thickness of about 2.6 mm.

The scale of the axis of the ordinate denotes the percental contributions of the factors re-emission, absorption and transmission to the total amount of irradiated power. Apart from the wavelength ranges around two minor absorption edges at 1900 nm and 1400 nm, the absorption amounts to approximately 20% within the wavelength range of 500 nm to 2500 nm. Due to the small absorption of the thin fiber rod, homogeneous heating is achieved in the tapered section 33 in the region of the apex. Additionally, due to the low absorption, radiation coupled into the fibers of the fiber bundle is transported along the fibers, so that the radiation also reaches those sections of the preform which are not primarily heated homogeneously. In particular, the center portions of the non-tapered part of the preform is heated by this light guiding mechanism so that at least a partly homogenisation of the radiation distribution inside the preform is achieved.

Figure 4:
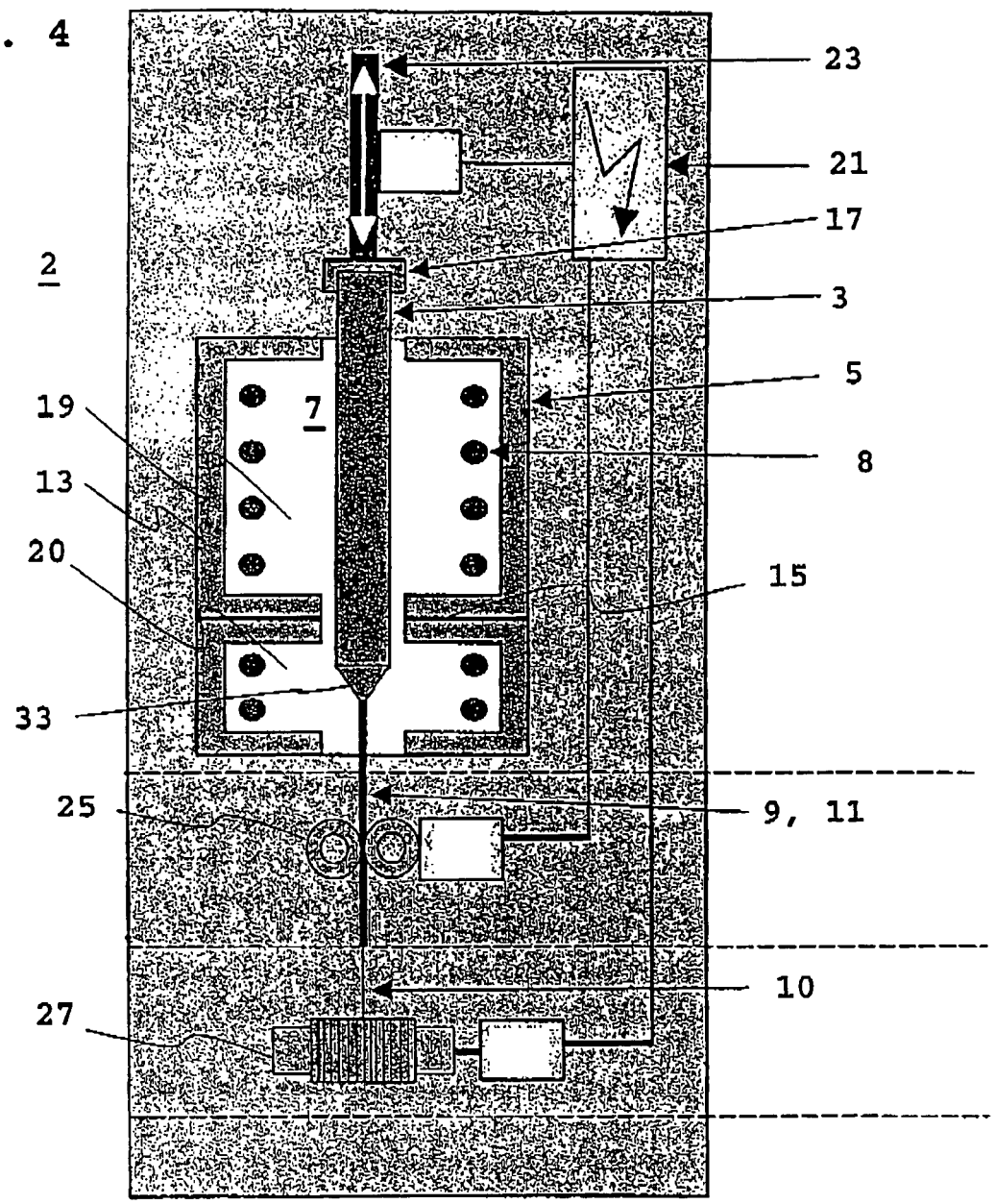
FIG. 4 shows a cross sectional schematic view in a vertical plane extending across the center of a multi fiber bundle down draw apparatus.

FIG. 4 shows a cross sectional outline in a vertical plane extending across the center of a multi fiber bundle down draw apparatus according to the invention which is suitable for execution of the inventive method utilizing semi-homogeneous heating.

The apparatus 2 comprises holding means 17 for holding the preform 3. The holding means 17 is movable by means of a driving gear in order to feed the preform 3 to the furnace.

Similar to the apparatus shown in FIG. 1, the apparatus according to FIG. 4 comprises radiators 8 as heater means, whereby the radiators 8 preferably emit short wave IR, e.g., at a temperature of 3000 K with considerable power of more than 50% of the total radiation power in the wavelength range of 200 nm to 2700 nm. The radiators 8 may be solid state emitters such as halogen tungsten emitters and/or gas discharge and/or electric-arc emitters. Reflective insulation walls 13 are provided to reflect transmitted or re-emitted radiation back to the preform 3.

Furthermore, the furnace 5 is divided into two heating zones 19, 20 which are separated by a separation disc 15. The first heating zone may advantageously be used to heat the preform 3 near to the drawing temperature. Subsequently, the preform 3 which is slowly inserted by the driving gear is heated up to the drawing temperature within the second heating zone 20.

Figure 5:
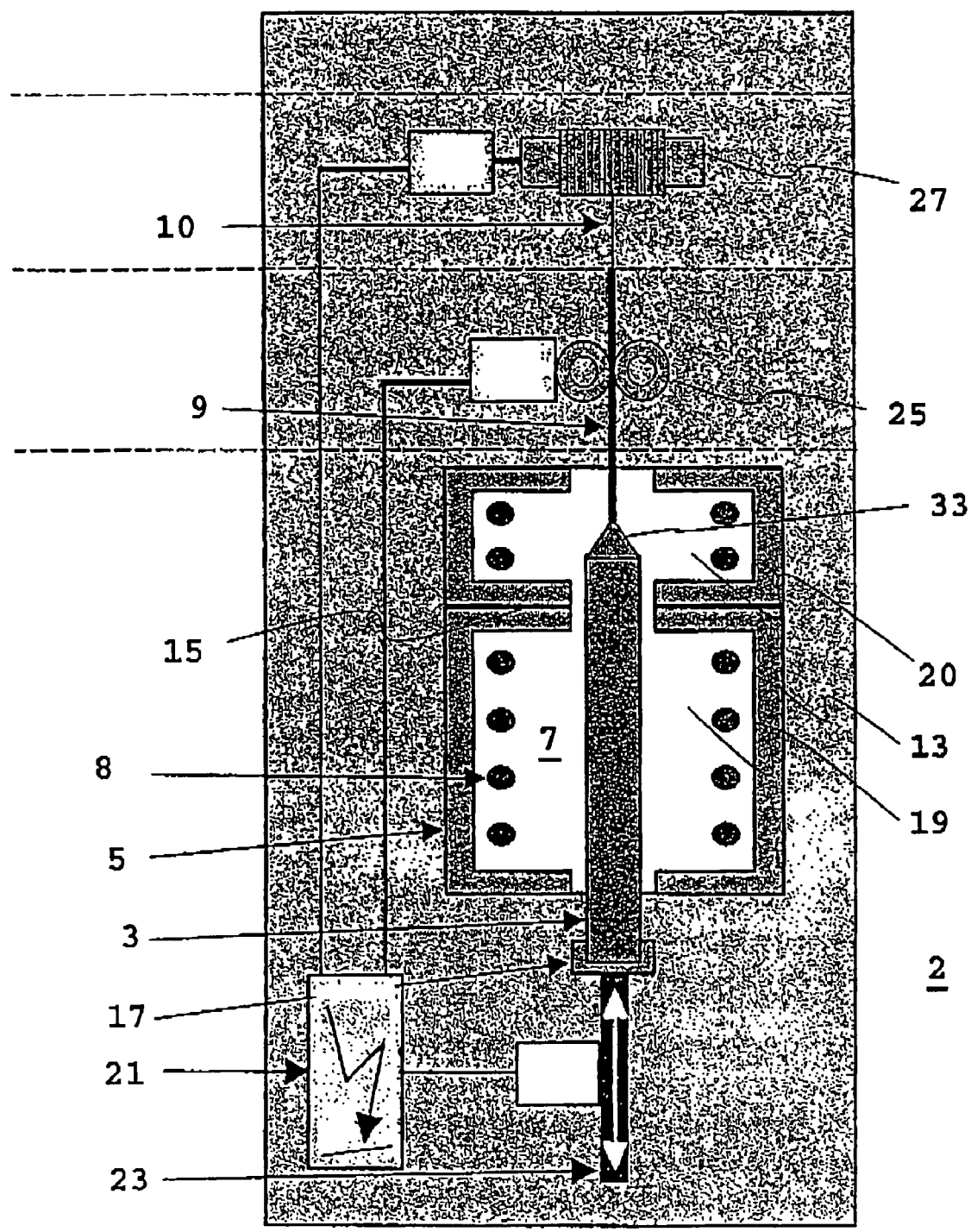
FIG. 5 shows a cross sectional view in a vertical plane extending across the center of a multi fiber bundle up draw apparatus.

The apparatus 2 as shown in FIG. 4 is designed as a down-draw tower. However, it may as well be constructed as an up-draw tower as shown in FIG. 5. Furthermore, the apparatus 2 may be adapted to be turned at least in part thereof by an angle of about 180° from a first angular position to a second angular position and is adapted to be used as a down draw apparatus in the first angular position and as an up draw apparatus in the second angular position.

Drawing means are provided to exert a drawing force onto the preform in order to draw a multi fiber cane 9, multi fiber rod 11 or fiber 10 out of the preform. As well, a fiber rod 11 comprising a cladding may be formed from a preform 3 comprising a cladding tube surrounding at least in part a core of a multi fiber preform.

The drawing means of the example shown in FIG. 4 comprise motor driven drawing rollers 25. Alternatively, a motor driven reel 27 may be provided as drawing means to exert a drawing force by reeling the drawn-out fiber 10. As well, a pair of clamps may be provided as means to exert a drawing force in order to draw a large diameter rod greater than 10 mm out of the preform.

The drawing procedure is controlled by means of a control unit 21 controlling both the drawing means 25, 27 and the driving gear 23. Additionally, means for controlling the power for the radiation units and the temperature of the preform, particularly of the tapered section 33 may be provided.

A fiber rod 11 obtained by drawing a fiber bundle preform utilizing an apparatus as shown in FIG. 4 or 5 and by employing the inventive method of semi-homogeneous heating may itself be a fiber preform for further processing, particularly for a further drawing procedure. Thus, the apparatus 2 as shown in FIGS. 4 and 5 may advantageously be employed to process a multi fiber preform 3, whereby i) a multi fiber preform 3 is heated semi-homogeneously by means of the radiators a, ii) the semi-homogeneously heated multi fiber preform 3 is drawn by means of the drawing rollers 25, iii) the drawn multi fiber preform being a fiber rod 11 is separated at predetermined length intervals, iv) a plurality of the drawn multi fiber preforms or fiber rods 11 which are separated according to step iii) are arranged in parallel forming a multi fiber bundle having an increased number of fibers. This multi fiber bundle obtained by steps i) to iii) is used as a new multi fiber preform 3. Steps i), ii) and iii) may be repeated one or more times by drawing the respective new multi fiber preform 3, until a multi fiber rod 11 is obtained having the desired number of fibers.

Additionally, the plurality of the drawn multi fiber preforms being a multi fiber rod 11 may be twisted at or after the drawing step. Twisting of the multi fiber rod may advantageously be carried out in order to produce fiber optical inverters.

A multi fiber rod 11 obtained by a respective drawing step may have a diameter of greater than 25 mm, greater than 50 mm, or even greater than 79 mm.

Besides of single fibers or fiber rods, other articles, particularly articles comprising fiber-optical components may be obtained which are formed at least in part or apt to be formed by a process according to the invention. In example, an article obtained by employing the inventive method whereby semi-homogeneous heating is applied may comprise an optical face plate, an optical taper, a photonic crystal fiber, a hollow fiber, a hollow fiber rod, an optical fiber inverter or fiber straight-through. Specifically, twisting the multi fiber rod 11 at or after the drawing step may advantageously applied in order to obtain a fiber optical inverter.

The draw apparatus as shown in FIGS. 4 and 5 or the facility as depicted in FIG. 1 may advantageously be adapted to work in a wide temperature range so as to enable drawing of many different materials including plastics and glass with the same apparatus. For instance, fiber canes 9, fibers 10 or multi fiber rods 11 may be formed using the facility 1 or the multi fiber draw apparatus 2, whereby more peripheral portions of the heated part of the preform have a temperature of between 290 K and 2000 K.

In FIG. 6, temperature distributions along a cross sectional view extending perpendicular to the longest dimension of a square shaped multi fiber bundle preform are displayed before drawing and in the course of drawing the multi fiber bundle preform. The temperature distributions have been photographed by means of a digital camera. Darker areas in the images indicate lower temperatures. As can be seen from the image on the right hand side of FIG. 6, radiation heating of a fiber bundle without tapered area results in a very inhomogeneous temperature distribution, whereby the temperature in the center portion of the bundle is lower than at the peripheral portion. This effects results from the low penetration depth of the radiation, although short wave infrared within the transparency window of the glass material has been applied. Thus, the non-tapered region of the preform is heated inhomogeneously by direct heating of the radiation sources.

On the other hand, the temperature distribution shown on the left hand side is nearly homogeneous. This effect results from a homogeneous heating of small-diameter parts of the tapered section of the preform. These parts are heated nearly homogeneously. The more homogeneous temperature distribution results from radiation coupled into the homogeneously heated parts of the tapered section and guided along the fibers into the inhomogeneously heated non-tapered section of the preform. Thus, semi-homogeneous heating has been applied, resulting in a nearly homogeneous temperature distribution across the entire cross section of the fiber bundle. However, there may still be small temperature differences between portions located in the middle and portions located at the periphery of the fiber bundle. Specifically, the temperature of a portion in the middle of the fiber bundle is lower than the temperature of a portion located at the periphery. It has been established, however, that the temperature gradient between a peripheral and a central portion within the heated part of a glass preform with a diameter of of more than 100 mm lies below 1 Kelvin per millimeter, whereby the central portion has a temperature of more than 580 K. Specifically, a preform with a diameter of 120 mm with a surface temperature or temperature of peripheral portions of about 630 K could be drawn easily using the inventive semi-homogeneous heating. The preform material is known to be drawable at temperatures of at least 595 K, appointing the minimum temperature at central portions of the preform. Thus, the preform has been heated with a temperature difference of 35 K at the most, resulting in a temperature gradient of less than 0.6 K/mm. In comparison, the maximum preform sizes that can be drawn with conventional heating are about 60 mm in diameter. If using a preform of the same glass, a surface temperature of 715 K has been measured, resulting in a temperature gradient of about 4 K/mm.

According to further experiments, the remaining temperature difference between more central and more peripheral portions within fiber bundles having diameters of at least 50 mm have been estimated to be 40 K at the most, whereby peripheral portions have a temperature of between 835 K and 915 K.

A heat-up time from a temperature of below 300 K up to more than 890 K of the peripheral portions of less than one hour could be applied without generating tension cracks. If drawing larger preforms, the heat-up period may be extended to less than 3 hours or less than six hours.

In the experiment illustrated in FIG. 6, a preform having quadratic cross-sectional shape has been chosen. However, the invention utilizing semi-homogeneous heating works as well with preforms having other cross-sectional shapes, e.g., preforms with circular, elliptic, octagonal or hexagonal cross-sections.

While this invention has been described in conjunction with the specific embodiments described above, other modifications, alternatives and variations of the present invention may occur to one of ordinary in the skill in the art based upon a review of the present application and these modifications, including equivalents thereof, are intended to be included within the scope of the present invention.

REFERENCE SIGNS

| | |
|---|---|
| 1 | Fiber drawing facility |
| 2 | Multi fiber bundle draw apparatus |
| 3 | Preform |
| 5 | Furnace |
| 7 | Radiation unit |
| 8 | Radiator |
| 9 | Fiber cane |
| 10 | Fiber |
| 11 | Multi fiber rod |
| 13 | Insulation |
| 15 | Separation disc |
| 17 | Preform holding means |
| 19, 20 | Heating zones |
| 21 | Control unit |
| 23 | Driving gear |
| 25 | Drawing rollers |
| 27 | Reel |
| 31 | Part of 3 inside of furnace 5 |
| 32 | Part of 3 outside of furnace 5 |
| 33 | Tapered section of 3 |

The invention claimed is:

1. A method of forming of an article made of a transparent, semitransparent, or opaque material selected from the group consisting of glass, glass ceramic, and plastic, the method comprising:

heating at least a part of said article with a radiation source; and forming said part of said article in a drawing process where a preform for said article is drawn to a smaller diameter, wherein said heating comprises radiation heating at least one section of the article having said smaller diameter with a first wavelength having a penetration depth larger than a dimension of the at least one section in the direction of the incident radiation and simultaneously irradiating at least one section of the perform with a second wavelength having a penetration depth lower than the dimension of the at least one section so that radiation having said first wavelength is guided via said article from said smaller diameter to said preform.

2. The method according to claim 1, wherein said heating causes an increase of temperature of said part at a more central portion that is lower than at a more peripheral portion of said article.

3. The method according to claim 2, wherein said more central portion is closer to a middle of said article than said more peripheral portion.

4. The method according to claim 3, wherein said more central portion is located in said middle of said article and said more peripheral portion is located at a periphery of said article.

5. The method according to claim 1, wherein said material comprises glass or several different glasses.

6. The method according to claim 1, wherein said material comprises glass ceramics.

7. The method according to claim 1, wherein said material comprises an organic material selected from the group consisting of plastic, synthetic, and polymeric material.

8. The method according to claim 1, wherein said material comprises glass and a material selected from the group consisting of plastic, synthetic, and polymeric material.

9. The method according to claim 1, further comprising controlling said radiation source to emit electromagnetic radiation in a wavelength range of 200 nm to 2700 nm.

10. The method according to claim 9, further comprising controlling said radiation source to emit more than 50% of the complete radiated power of said electromagnetic radiation in a wavelength range of 200 nm to 2700 nm.

11. The method of claim 9, wherein said radiation source is a radiator having a temperature of more than 1500 K.

12. The method of claim 9, wherein said radiation source is a radiator having a temperature of about 3000 K.

13. The method according to claim 1, wherein forming said part of said article comprises exposing said article to a draw process.

14. The method according to claim 13, wherein said part of said article comprises glass having a diameter of more than 100 mm, wherein a temperature gradient between a peripheral and a central portion of said part lies below 1 Kelvin per millimeter, and wherein said central portion has a temperature of more than 580 K.

15. The method according to claim 13, wherein said part of said article comprises glass and has a diameter of at least 50 mm and that a temperature difference of 100 K at the most exists between a more central portion of the article and a more peripheral portion when said part is heated.

16. The method according to claim 13, wherein said article comprises a more central portion and a more peripheral portion characterized in that said part of said article comprises glass and has a diameter of at least 50 mm and that a temperature difference of 40 K at the most exists between said more central portion and said more peripheral portion when said part is heated.

17. The method according to claim 13, wherein said article comprises a more central portion and a more peripheral portion, and wherein said heating comprising heating said more peripheral portion of said part in a period of time of less than six hours from a temperature of lower than 300 K to a temperature of higher than 890 K.

18. The method according to claim 17, wherein said period of time is less than three hours.

19. The method according to claim 17, wherein said period of time is less than one hour.

20. The method according to claim 13, wherein said more peripheral portion has a temperature of between 290 K and 2000 K when said article is formed.

21. The method according to claim 13, wherein said drawing process has a rate of drawing of a drawn part of the article relative to an input part of the article exceeds a velocity of 10 mm per minute.

22. The method according to claim 13, wherein said article is a fiber preform.

23. The method according to claim 22, wherein said fiber preform has a circular cross sectional shape.

24. The method according to claim 22, wherein said fiber preform has an elliptic cross sectional shape.

25. The method according to claim 22, wherein said fiber preform has a quadratic cross sectional shape.

26. The method according to claim 22, wherein said fiber preform has an octagonal cross sectional shape.

27. The method according to claim 22, wherein said fiber preform has a hexagonal cross sectional shape.

28. The method according to claim 22, wherein said fiber preform comprises a cladding tube surrounding at least in part a core of a multi fiber preform.

29. The method according to claim 13, wherein said article is a multi fiber preform comprising a plurality of fiber preforms arranged in parallel and in close neighborhood.

30. The method according to claim 1, wherein forming said part of said article comprises exposing said article to an up-draw process.

31. The method according to claim 1, wherein forming said part of said article comprises exposing said article to a down-draw process.

32. A method of processing a multi fiber bundle made of a transparent, semitransparent, or opaque material selected from the group consisting of glass, glass ceramic, and plastic, comprising:
heating at least a part of said multi fiber bundle with a radiation source; and
forming said part, wherein said heating comprises radiation heating at least one section of the article with a first wavelength having a penetration depth larger than a dimension of the part in the direction of the incident radiation and simultaneously with a second wavelength having a penetration depth lower than the dimension of the part, wherein said forming is performed in a drawing process to draw a preform for a fiber bundle to a smaller diameter, wherein said heating comprises irradiating said fiber bundle having the smaller diameter with radiation of said first wavelength so that said radiation of said first wavelength is guided via said fiber bundle with said smaller diameter to said preform so that at least a partly homogenization of radiation distribution in said preform is achieved.

33. The method according to claim 32, wherein said multi fiber bundle has a diameter of more than 100 mm.

34. The method according to claim 33, wherein said multi fiber bundle has a diameter of more than 125 mm.

35. The method according to claim 33, wherein said multi fiber bundle has a diameter of more than 150 mm.

36. The method according to claim 33, wherein said multi fiber bundle has a diameter of more than 200 mm.

37. The method according to claim 33, wherein said forming provides a multi fiber rod having a diameter greater than 25 mm.

38. The method according to claim 33, wherein said forming provides a multi fiber rod having a diameter greater than 50 mm.

39. The method according to claim 33, wherein said forming provides a multi fiber rod having a diameter greater than 75 mm.

40. A method of forming of an article made of a transparent, semitransparent, or opaque material selected from the group consisting of glass, glass ceramic, and plastic, the method comprising:

drawing the article from a perform having a first region with a larger diameter to define a second region with a smaller diameter such that a tapered region is defined between the first and second regions;

irradiating the first region of the article with radiation of a first wavelength having a penetration depth lower than the larger diameter; and irradiating, simultaneous to the irradiation of the first region, the second and tapered regions with radiation of a second wavelength having a penetration depth that is larger than the smaller diameter, wherein irradiating the second and tapered regions comprises irradiating with incident radiation at an angle so that the second wavelength is axially transported through the article to a central portion of the first region.

41. The method according to claim 40, wherein said drawing comprises down-draw drawing.

42. The method according to claim 40, wherein said drawing comprises up-draw drawing.

43. A method of forming of an article made of a transparent, semitransparent, or opaque material selected from the group consisting of glass, glass ceramic, and plastic, the method comprising:

drawing the article from a perform having a first region with a larger diameter to define a second region with a smaller diameter such that a tapered region is defined between the first and second regions;

irradiating the first region of the article with radiation of a first wavelength having a penetration depth lower than the larger diameter; and irradiating, simultaneous to the irradiation of the first region, the second region or the tapered region with radiation of a second wavelength having a penetration depth that is larger than the smaller diameter, wherein irradiating the second or tapered regions comprises irradiating with incident radiation at an angle so that the second wavelength is axially transported through the article to a central portion of the first region.

* * * * *